United States Patent Office

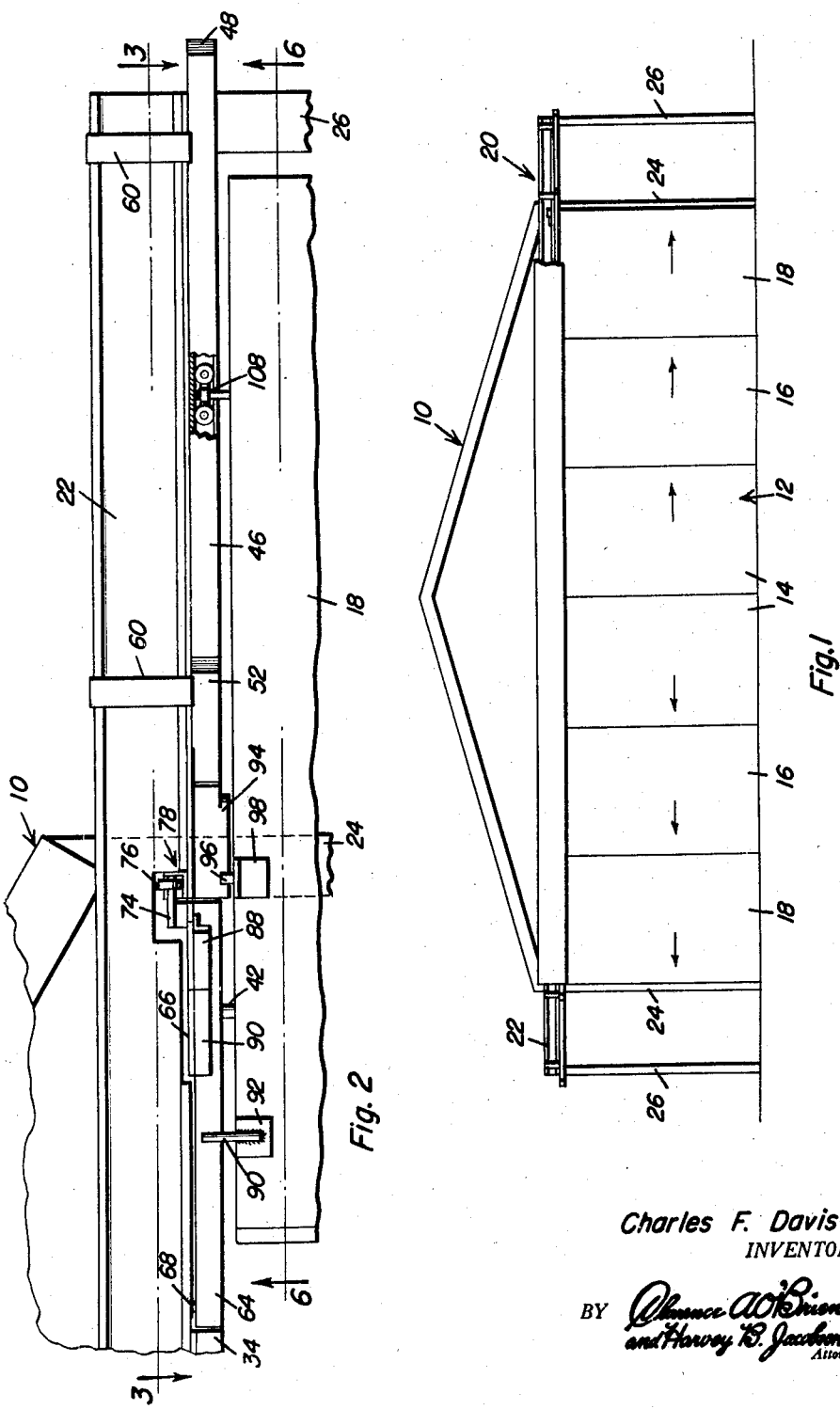

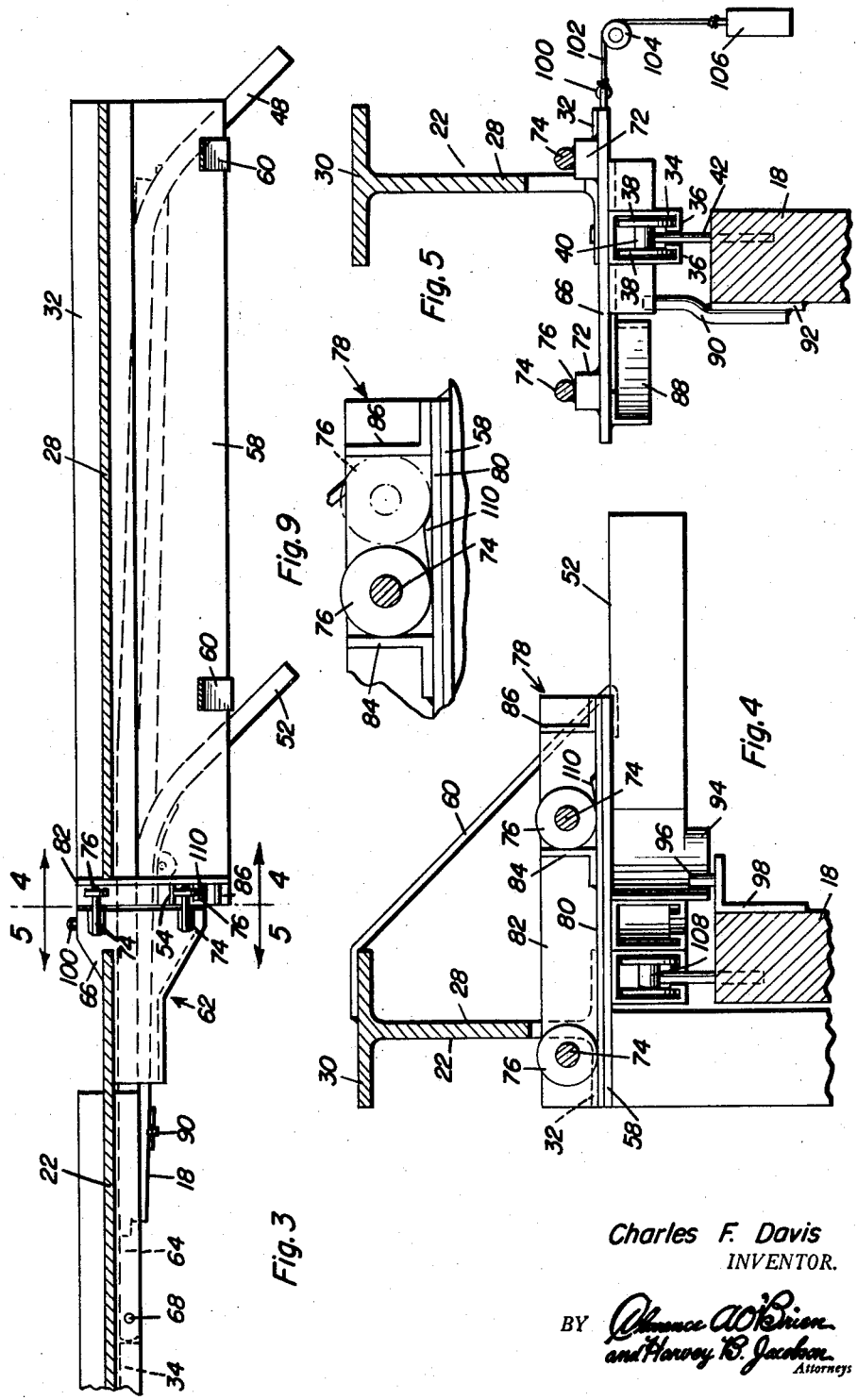

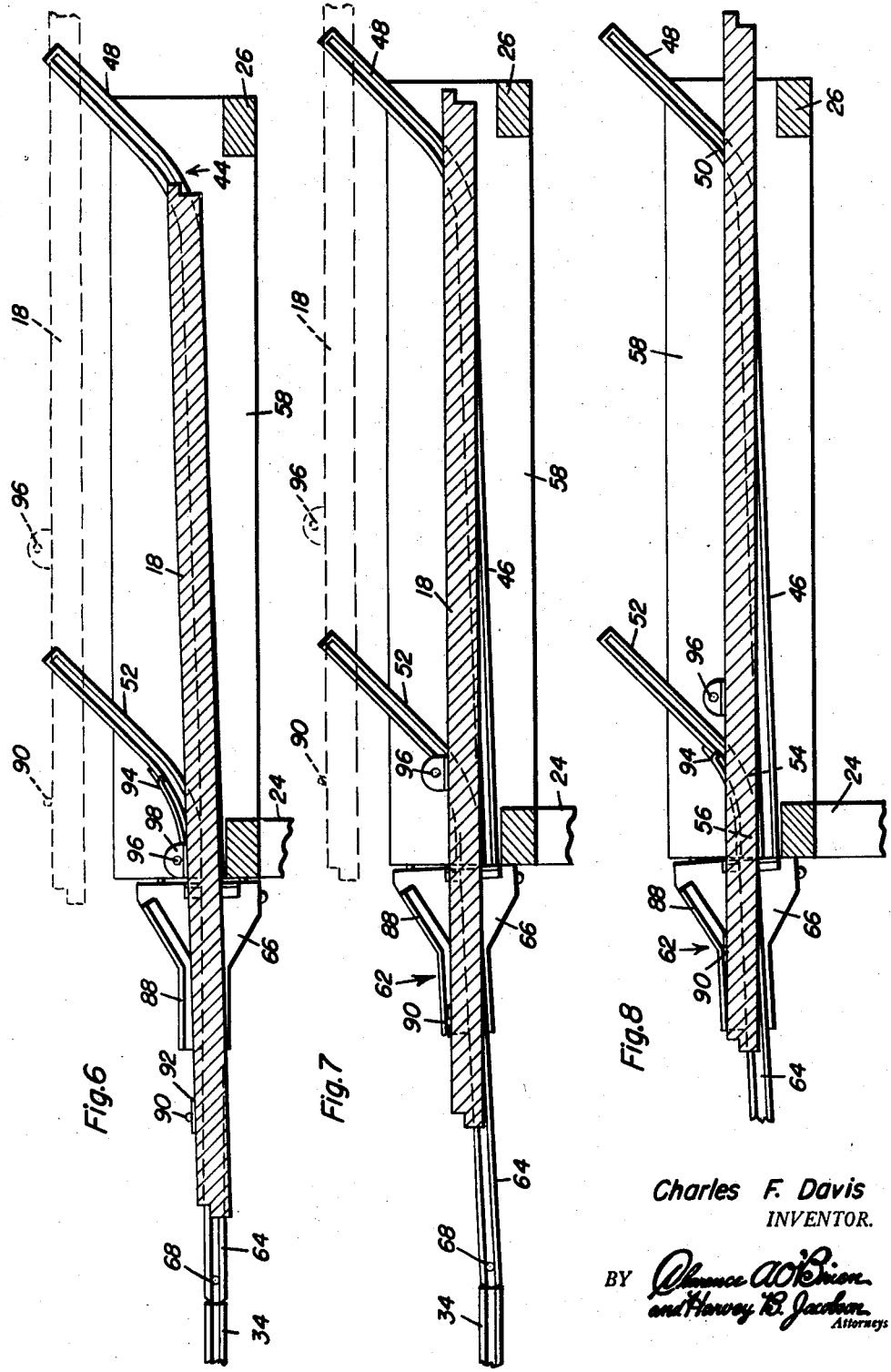

2,904,852
Patented Sept. 22, 1959

2,904,852

SLIDING DOOR STORAGE TRACK ARRANGEMENT

Charles F. Davis, Iron Mountain, Mich.

Application September 17, 1957, Serial No. 684,493

6 Claims. (Cl. 20—19)

This invention relates in general to new and useful improvements in door construction, and more specifically to a sliding door storage track arrangement.

In multiple door installations covering a large open area, such as the front of hangars, and the like, the storage of the doors in their open positions presents a problem. Heretofore this has been accomplished by the provision of a plurality of separate tracks for the individual doors whereby the doors may be readily stacked in overlapping relation to one side of a building. While this system has proved successful, not only is the installation expensive because of the necessity of a plurality of tracks, but also because of the plurality of the tracks, it is very difficult to properly weatherstrip the door assembly.

It is therefore the primary object of this invention to provide an improved sliding door storage track arrangement wherein the opening is provided with a single track entirely thereacross, the track being provided on at least one end thereof with offset track portions to facilitate the storage of a plurality of individual door sections in overlapping relation.

Another object of this invention is to provide an improved storage track arrangement for a plurality of sliding door sections, the storage track arrangement including an auxiliary track section which is aligned with the normal door supporting track portion, the storage track portion also including offset track sections which are associated with the auxiliary track section whereby doors passing into the storage portion of the track will be offset sideways from the auxiliary track section in order that a plurality of door sections may occupy the same general area in overlapping relation.

Still another object of this invention is to provide an improved track assembly for a plurality of sliding doors disposed in alignment, the track assembly including a main track section for normally supporting door sections in closed positions, and a storage portion, the storage portion including an auxiliary track section having associated therewith offset track sections, there being disposed intermediate the main track section and the auxiliary track section a switch for selectively directing door hangars onto the auxiliary track section or onto one of the offset track sections.

A further object of this invention is to provide an improved switch assembly for use in overhead door track assemblies, the switch being so constructed whereby it is normally urged back to a "straight" position and is so constructed whereby one end of a door will pass straight through the switch and the opposite end of a door will have the hangar thereof automatically switched by the switch onto an offset track portion whereby doors may automatically be moved to offset position with respect to the normal plane of the doors.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1 is an elevational view of the front of a large building, such as an aircraft hangar, which is provided with the door and track assembly which is the subject of this invention, a portion of a weather shield being broken away for purposes of clarity at one end thereof;

Figure 2 is an enlarged fragmentary elevational view at the upper end of the track assembly and shows generally the details thereof in the relationship of a door supported thereby;

Figure 3 is an enlarged fragmentary horizontal sectional view taken substantially upon the plane indicated by the section line 3—3 of Figure 2 and shows the specific details of the storage portion of the track assembly and the mounting of the switch;

Figure 4 is an enlarged fragmentary transverse sectional view taken substantially upon the plane indicated by the section line 4—4 of Figure 3 and shows further the details of the mounting of the switch and the relationship of a guide pin with respect to a cam track which will affect the automatic operation of the switch;

Figure 5 is an enlarged fragmentary sectional view taken substantially upon the plane indicated by the section line 5—5 of Figure 3 and shows further the details of the switch and the details of an additional guide pin or follower and a second cam track for actuating the switch;

Figure 6 is an enlarged fragmentary sectional view taken substantially upon the plane indicated by the section line 6—6 of Figure 2 and shows the positioning of a door section in an intermediate position on the storage portion of the track assembly;

Figure 7 is an enlarged fragmentary sectional view similar to Figure 6 and shows a further movement of the door section along the storage portion with the switch in a switched position;

Figure 8 is another fragmentary enlarged sectional view similar to Figure 6 and shows a further position of the door section as it moves towards its final storage position which is illustrated in Figures 6 and 7 by dotted lines; and Figure 9 is a fragmentary transverse sectional view on a large scale showing the specific details of a wedge-shaped wheel retainer for retaining the switch in a last position.

Referring now to the drawings in detail, it will be seen that there is illustrated in Figure 1 a large building 10 which has a wide open front. The building 10 is in the form of an aircraft hangar or the like and has the wide open end thereof normally closed by a door assembly which is referred to in general by the reference numeral 12. The door assembly 12 includes a plurality of central doors 14, a pair of intermediate doors 16, and end doors 18. The doors or door sections 14, 16 and 18 are mounted on a track assembly which is referred to in general by the reference numeral 20.

The track assembly is carried by a main supporting beam 22 which extends entirely across the front of the building 10 and which is supported adjacent its ends by means of side walls 24 of the building 10 and columns 26 disposed at the ends of the beam 22.

As best shown in Figure 5, the beam 22 includes an upstanding web 28, a top flange 30 and a lower flange 32. Secured to the underside of the bottom flange 32 is a main track section 34 which is in the form of a normally door supporting portion. The track section 34 is of an inverted channel-shaped cross-section and is secured to the flange 32 in offset relation thereto in any suitable manner. It is to be noted that the track section 34 includes track parts 36 which are spaced apart and which are engaged by wheels 38 of a door hanger 40. The door hanger 40 also includes a hanger rod 42 which extends downwardly between the track parts 36 and which is suitably secured to the upper end of one of the door sections 18. When the door sections 14, 16 and 18 are all in closed position, such as that illustrated in Figure 1, all of the door sections 14, 16 and 18 are supported by the main track sections 34.

Disposed at opposite ends of the main track sections 34 are storage portions which are referred to in general by the reference numeral 44. Inasmuch as the two storage portions 44 are identical, only one of these storage portions will be described in detail hereinafter.

The storage portion 44 includes an auxiliary track section 46 which is generally aligned with the main track section 34 but is disposed at a slight angle thereto. The auxiliary track section 46 terminates in an offset end section 48 which is connected to the auxiliary track section 46 by a curved portion 50.

The storage portion 44 also includes an intermediate offset section 52 which has formed integrally therewith a curved portion 54 and a straight initial portion 56. The initial portion 56 is disposed immediately adjacent one end of the auxiliary track section 46.

Secured to the underside of the bottom flange 32 and extending outwardly therefrom is a relatively wide support plate 58. The support plate 58 is braced at intervals by diagonal straps 60, as is best shown in Figures 3 and 4. The auxiliary track section 46, the offset end section 48, and the intermediate offset section 52 are all secured to the underside of the plate 58 and supported thereby.

The main track section 34 is spaced from the storage track portion 44 by means of a switch which is referred to in general by the reference numeral 62. The switch 62 includes a switch track section 64 which is secured to the underside of a plate 66. The end of the switch track section 64 is pivotally connected to the beam 22 by means of a vertical pivot pin 68. The opposite end of the switch 62 is supported by means of the plate 66. As is best shown in Figures 3, 4 and 5, secured to the upper side of the plate 66 by means of welding 70 and spacer blocks 72 are shafts 74 which carry rollers 76. The rollers 76 are engaged on a transverse track section 78 which is carried by the left end of the plate 58. The transverse track section 78 is in the form of an angle member having a horizontal flange 80 and a vertical flange 82. Carried by the transverse track section 78 in spaced back-to-back relation are angle members 84 and 86 which function as stops for the switch 62.

As is best shown in Figures 5 and 6, secured to the underside of the plate 66 is a cam track 88. The cam track 88 is disposed along one edge of the plate 66 and is engaged by an upwardly projecting pin or cam follower 90 which is secured to the upper part of each of the door sections 16 and 18 by means of the mounting plate 92. Referring to the right-hand door sections 16 and 18, it will be seen that the cam follower 90 is disposed adjacent the left end thereof, as is best shown in Figure 6.

Carried by the plate 58 on the underside thereof immediately adjacent the curved portion 54 and the entrance portion 56 of the intermediate offset section 52 is a second cam track 94. The cam track 94 is engageable by a pin or cam follower 96 carried by an angle bracket 98 secured to the upper part of each of the door sections 16 and 18. It is to be noted that the cam follower 96 is disposed inwardly to the right of the left end of the right door sections 16 and 18.

Carried by the switch plate 66 is an eye 100 to which there is connected a cable 102 which passes over a pulley 104 and which has connected to the lower end thereof a weight 106. The purpose of the weight 106 is to always close the switch 62 to a position whereby the switch track section 64 is aligned with the auxiliary track section 46.

The switch track section 64 will be aligned with the auxiliary track section 46 with the roller 76 disposed between the stops 84 and 86 into engagement with the stop 84, as is best shown in Figure 4.

Referring now to Figures 3, 4 and 5, in particular, it will be seen that it has been necessary to cut away a portion of the beam 22 in order to provide clearance for the switch 62. It is to be understood that only that portion of the beam 22 which is absolutely necessary is cut away so that the beam 22 may still retain its maximum strength.

The hanger 40 illustrated in Figure 5 is the left hand hanger for the door section 18. The door section 18 will also have a right hand hanger 108 which will be of an identical construction. In fact, each of the door sections will include a right hand hanger and a left hand hanger.

When it is desired to open the door 12, in the opening of the right-hand half thereof, the right hand door section 18 is moved to the right, with the result that the hanger 108 will pass from the main track section 34 onto the switch track section 64 and then onto the auxiliary track section 46. As the left-hand hanger 40 of the door section 18 approaches the auxiliary track section 46 and is moving along the switch track section 64, the cam follower 96 will engage the cam track 94 and will cause swinging movement of the left end of the door section 18 outwardly. Since the left-hand door hanger 40 is engaged with the switch track section 64, this will swing the switch 62 outwardly so as to align the switch track section 64 with the entrance portion 56 of the intermediate offset track section 52. The left-hand door hanger 40 will then enter the entrance portion 56 and will then move into the curved portion 54 simultaneous with the movement of the right-hand hanger 108 into the curved portion 50. The hangers 40 and 108 will then move into the offset track sections 52 and 48, respectively, to shift the door section 18 outwardly out of alignment with the auxiliary track section 46.

After the door section 18 has been stored, the right-hand door section 16 may be stored in identically the same manner. If desired, the door section 14 may be so constructed whereby it is not necessary that the hangers thereof move off of the intermediate track section 46 and the switch track section 64. Therefore, it will be necessary for the door sections 14 to be provided with the cam followers 90 and 96.

The left-hand door sections 14, 16 and 18 will, of course, be stored on the left-hand storage track portion 44 in the same manner described but with respect to the right-hand floor sections 14, 16, and 18. At this time it is pointed out that if so desired all of the door sections may be stored at one side of the opening in the building 10. This will be accomplished by making the offset track sections 52 and 48 deeper and providing all of the door sections with the exception of the left-hand door section 18 with cam followers such as the cam followers 90 and 96.

When it is desired to move the door sections to closed positions, the door sections 14 will move freely from the storage portion 44 back onto the main track section 34. As the door section 16 is moved back from its storage position, the cam follower 96 thereof will engage the cam track 88 on the switch 62 and shift the switch 62 so that the switch track sections 64 will be aligned with the entrance portion 56 of the intermediate offset track section 52. The door hanger 40 will then move on to the switch track section 64 and then pass on to the main track section 34. The weight 106 will then return the switch 62 to its normal position with the switch track section 64 in alignment with the auxiliary track sections 46 for receiving the right-hand door hanger 108.

The door section 18 will be returned to its closed position in the same manner as that described above with respect to the door section 16.

While a door assembly 12 has been illustrated as containing six door sections, it is to be understood that the number of door sections may be varied as desired. Also, as was pointed out above, all of the door sections may be stored in one end of the building or, if desired, the door sections may be stored at both ends of the building as illustrated in Figure 1.

Referring now to Figure 9 in particular, it will be seen that mounted on the horizontal flange 80 intermediate the angle members 84 and 86 is a cam-shaped retainer 110. The retainer 110 engages the roller 76 and urges the roller 76 against either the flange 84 or the flange 86, depending upon the last position of the switch 62.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A sliding door assembly comprising an overhead track, a plurality of individual doors disposed in alignment in a single plane and suspended from said track, said track including a normally door supporting portion and a storage portion, said door supporting portion being in the form of a main track section, said storage portion including an auxiliary track section forming a continuation of said main track section and terminating in an offset end section remote from said main track section, an intermediate offset section disposed adjacent the other end of said auxiliary track section, a switch disposed intermediate said main track section and said auxiliary track section and said intermediate track section, a pair of spaced hangers on each of said doors suspending said doors from said track, first shift means connected to said switch for normally aligning said switch with said auxiliary track section whereby a first one of said hangers of each door will move along said auxiliary track section and onto said offset end section, and second shift means for automatically shifting said switch into alignment with said intermediate offset section whereby a second one of said hangers of each door will move onto said intermediate offset section to store said doors in overlapping generally parallel relation, a beam supporting said track, said switch being pivotally connected to said beam adjacent said main track section, a support plate extending outwardly from said beam, said support plate including a transverse track section, hangers on the opposite end of said switch engaging said transverse track section and supporting said opposite end of said switch.

2. A sliding door assembly comprising an overhead track, a plurality of individual doors disposed in alignment in a single plane and suspended from said track, said track including a normally door supporting portion and a storage portion, said door supporting portion being in the form of a main track section, said storage portion including an auxiliary track section forming a continuation of said main track section and terminating in an offset end section remote from said main track section, an intermediate offset section disposed adjacent the other end of said auxiliary track section, a switch disposed intermediate said main track section and said auxiliary track section and said intermediate track section, a pair of spaced hangers on each of said doors suspending said doors from said track, first shift means connected to said switch for normally aligning said switch with said auxiliary track section whereby a first one of said hangers of each door will move along said auxiliary track section and onto said offset end section, and second shift means for automatically shifting said switch into alignment with said intermediate offset section whereby a second one of said hangers of each door will move onto said intermediate offset section to store said doors in overlapping generally parallel relation, a beam supporting said track, said switch being pivotally connected to said beam adjacent said main track section, a support plate extending outwardly from said beam, said support plate including a transverse track section, hangers on the opposite end of said switch engaging said transverse track section and supporting said opposite end of said switch, said support plate also supporting said offset end section and said intermediate offset section.

3. A sliding door assembly comprising an overhead track, a plurality of individual doors disposed in alignment in a single plane and suspended from said track, said track including a normally door supporting portion and a storage portion, said door supporting portion being in the form of a main track section, said storage portion including an auxiliary track section forming a continuation of said main track section and terminating in an offset end section remote from said main track section, an intermediate offset section disposed adjacent the other end of said auxiliary track section, a switch disposed intermediate said main track section and said auxiliary track section and said intermediate track section, a pair of spaced hangers on each of said doors suspending said doors from said track, first shift means connected to said switch for normally aligning said switch with said auxiliary track section whereby a first one of said hangers of each door will move along said auxiliary track section and onto said offset end section, and second shift means for automatically shifting said switch into alignment with said intermediate offset section whereby a second one of said hangers of each door will move onto said intermediate offset section to store said doors in overlapping generally parallel relation, said second shift means including a fixed cam track mounted adjacent said intermediate offset section, and a cam follower for said fixed cam track carried by each door in advance of said second hanger whereby each door is shifted to shift said switch to momentarily align said switch with said intermediate offset section during a door storing operation.

4. A sliding door assembly comprising an overhead track, a plurality of individual doors disposed in alignment in a single plane and suspended from said track, said track including a normally door supporting portion and a storage portion, said door supporting portion being in the form of a main track section, said storage portion including an auxiliary track section forming a continuation of said main track section and terminating in an offset end section remote from said main track section, an intermediate offset section disposed adjacent the other end of said auxiliary track section, a switch disposed intermediate said main track section and said auxiliary track section and said intermediate track section, a pair of spaced hangers on each of said doors suspending said doors from said track, first shift means connected to said switch for normally aligning said switch with said auxiliary track section whereby a first one of said hangers of each door will move along said auxiliary track section and onto said offset end section, and second shift means for automatically shifting said switch into alignment with said intermediate offset section whereby a second one of said hangers of each door will move onto said intermediate offset section to store said doors in overlapping generally parallel relation, said second shift means including a movable cam track carried by said switch, and a cam follower for said movable cam track carried by each door behind said second hanger whereby said switch is momentarily shifted into alignment with said intermediate offset portion during a door closing operation.

5. A sliding door assembly comprising an overhead track, a plurality of individual doors disposed in alignment in a single plane and suspended from said track, said track including a door supporting portion and a storage portion, said door supporting portion being in the form of a main track section, said storage portion including an auxiliary track section forming a continuation of said main track section and terminating in an offset end section remote from said main track section, an intermediate offset section disposed adjacent the other end of said auxiliary track section, a horizontal beam overlying and supporting said main track section, a switch disposed intermediate said main track section and said auxiliary track section and said intermediate track section, a pair of spaced hangers on each of said doors suspending said doors from said track, said switch being pivotally connected to said beam adjacent said main track section, a support plate extending outwardly from said beam, said support plate including a transverse track section, hangers on the opposite end of said switch engaging said transverse track section and supporting said opposite end of said switch, first and second stop means on said transverse track section for engaging one of said switch hangers and aligning said switch with said auxiliary track section and said intermediate offset section, overridable means connected to said switch and normally urging one of said switch hangers into engagement with said first stop means to normally align said switch with said auxiliary track section whereby a first one of said door hangers of each door will move along said auxiliary track section and onto said offset end section, and shift means carried by each of said doors adjacent the other of said hangers of each door for engaging said switch and automatically temporarily shifting said switch into alignment with said intermediate offset section whereby the second one of the hangers of each door wil move onto said intermediate offset section to store said doors in overlapping generally parallel relation.

6. A sliding door assembly comprising an overhead track, a plurality of individual doors disposed in alignment in a single plane and suspended from said track, said track including a door supporting portion and a storage portion, said door supporting portion being in the form of a main track section, said storage portion including an auxiliary track section forming a continuation of said main track section and terminating in an offset end section remote from said main track section, an intermediate offset section disposed adjacent the other end of said auxiliary track section, a horizontal beam overlying and supporting said main track section, a switch disposed intermediate said main track section and said auxiliary track section and said intermediate track section, a pair of spaced hangers on each of said doors suspending said doors from said track, said switch being pivotally connected to said beam adjacent said main track section, a support plate extending outwardly from said beam, said support plate including a transverse track section, hangers on the opposite end of said switch engaging said transverse track section and supporting said opposite end of said switch, first and second stop means on said transverse track section for engaging one of said switch hangers and aligning said switch with said auxiliary track section and said intermediate offset section, overridable means connected to said switch and normally urging one of said switch hangers into engagement with said first stop means to normally align said switch with said auxiliary track section whereby a first one of said door hangers of each door will move along said auxiliary track section and onto said offset end section, and shift means carried by each of said doors adjacent the other of said hangers of each door for engaging said switch and automatically temporarily shifting said switch into alignment with said intermediate offset section whereby the second one of the hangers of each door will move onto said intermediate offset section to store said doors in overlapping generally parallel relation, said shift means including a movable cam track carried by said switch, and a cam follower for moving said cam track, whereby said switch is momentarily shifted into alignment with said intermediate offset portion during a door closing operation.

References Cited in the file of this patent
UNITED STATES PATENTS

| 1,447,167 | Bee et al. | Mar. 6, 1923 |

FOREIGN PATENTS

| 568,332 | France | Mar. 22, 1924 |
| 624,907 | Germany | Jan. 30, 1936 |
| 814,568 | France | June 25, 1937 |
| 374,684 | Italy | Sept. 5, 1939 |
| 942,965 | Germany | May 9, 1956 |